(12) United States Patent
Hsiao et al.

(10) Patent No.: US 9,134,018 B2
(45) Date of Patent: Sep. 15, 2015

(54) BACKLIGHT MODULE FOR LIQUID CRYSTAL DISPLAY DEVICE AND METHOD FOR MAKING HEATSINK

(75) Inventors: Yu-chun Hsiao, Guandong (CN); Chong Huang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 397 days.

(21) Appl. No.: 13/641,103

(22) PCT Filed: Aug. 21, 2012

(86) PCT No.: PCT/CN2012/080410
§ 371 (c)(1),
(2), (4) Date: Oct. 13, 2012

(87) PCT Pub. No.: WO2014/026397
PCT Pub. Date: Feb. 20, 2014

(65) Prior Publication Data
US 2014/0184982 A1    Jul. 3, 2014

(51) Int. Cl.
*F21V 29/00*  (2015.01)
*B23P 15/26*  (2006.01)
*G02F 1/1335* (2006.01)

(52) U.S. Cl.
CPC .................. *F21V 29/22* (2013.01); *B23P 15/26* (2013.01); *G02F 1/1336* (2013.01); *G02F 1/133615* (2013.01); *G02F 2001/133628* (2013.01); *Y10T 29/49789* (2015.01)

(58) Field of Classification Search
None
See application file for complete search history.

(56) References Cited

U.S. PATENT DOCUMENTS 5,907,905 A *  6/1999  Lee ........................... 29/898.042
8,049,834 B2 * 11/2011  Mo et al. ......................... 349/58

* cited by examiner

*Primary Examiner* — Richard Kim
(74) *Attorney, Agent, or Firm* — Andrew C. Cheng

(57) ABSTRACT

A backlight module for a liquid crystal display and a method for manufacturing a heat dissipation part of the backlight module. The method includes the steps of: preparing a hollow pipe (20), wherein the hollow pipe (20) has a hollow structure, the section of the hollow pipe (20) in a transverse direction is a "回" shape, and the hollow pipe (20) comprises a first bearing part (211), a second bearing part (212), a first vertical part (221) and a second vertical part (222); and cutting the hollow pipe (20), wherein the first vertical part and the second vertical part are respectively cut in a vertical direction to cut the hollow pipe into two heat dissipation parts, a heat dissipation part is formed by the first bearing part (211) and the first vertical part (221), and the other dissipation part is formed by the second bearing part (212) and the second vertical part (222). According to the method, the production cost can be reduced and the product can be thinned and lightened.

5 Claims, 3 Drawing Sheets

BACKLIGHT MODULE FOR LIQUID CRYSTAL DISPLAY DEVICE AND METHOD FOR MAKING HEATSINK

FIELD OF THE INVENTION

The present invention relates to a technologic field of liquid crystal display, and more particularly to a backlight module for use with the liquid crystal display device, and a heatsink for use with the backlight module. The present invention further relates to a method for making the heatsink.

BACKGROUND OF THE INVENTION

With the development of the technology of liquid crystal display device, the requirements for heatsink used in the liquid crystal display device have become more and more strict. Currently, a backlight for use with the liquid crystal display device is generally configured with a light source made of LED, and the light source where the heat buildup thereof has to be dissipated. In order to achieve an excellent heat dissipating performance, the liquid crystal display device has to be incorporated with a heatsink with a comparably large and wide aluminum extrusion.

Currently, in order to provide a work piece with larger surface dimension, the thickness of the aluminum extrusion has to be increased proportionally. Otherwise, if the thickness of the aluminum extrusion is not good enough, the work piece tends to warp because of its thinness. As a result, it would be difficult to create a heatsink device with a comparably thin thickness. However, while it is beneficial to increase the thickness of the aluminum extrusion as it can bring about a comparably sturdy heatsink, the cost of the heatsink is inevitably increased. On the other hand, the heatsink with a comparably thicker dimension is not good for the trend of slim, compact and light of the heatsink.

SUMMARY OF THE INVENTION

It is the purpose of the present invention to provide a backlight module for use with a liquid crystal display device, and also a method for making a heatsink incorporated within the backlight module so as to resolve the technical issue encountered by the prior art.

In order to resolve the technical issue encountered by the prior art, the present invention provides a technical solution by introducing a method for making a heatsink device to be incorporated into a liquid crystal display device, the method comprising the steps of: a) providing a hollowed tube having a substantially rectangular cross section, and the tube including a first support portion, a second supporting, a first vertical section, and a second vertical section interlinked with each other; and b) cutting the hollowed tube along the first and second vertical sections along a longitudinal direction such that first heatsink unit configured with the first supporting portion and the first vertical section, and a second heatsink unit configured with the second supporting portion and the second vertical section are created.

Wherein further comprises the steps of having the first supporting portion being perpendicular to the first and second vertical sections, and having the second supporting portion being perpendicular to the first and second vertical sections.

Wherein further comprises the steps of providing a first transitional angle between the first supporting portion and the first vertical section, and providing a second transitional angle between the second supporting portion and the second vertical section, wherein the first and second transitional angles are chamfered angles or C-shaped angles.

Wherein the hollowed tube is made from aluminum.

Wherein further comprises the step of providing a die so as to extrude the hollowed tube through the die.

Wherein further comprises the steps of providing a first rib on the first supporting portion in an area adjacent to the first vertical section, and providing a second rib on the second supporting portion in an area adjacent to the second vertical section, wherein the first and second ribs extend beyond an inner surface of the first and second supporting portions.

Wherein further comprises the steps of grinding the first and second ribs so as to provide a top plateau thereof, and cutting the first and second vertical sections inline with the top plateau of the first and second ribs so as to create the first heatsink unit and second heatsink unit.

In order to resolve the technical issue encountered by the prior art, the present invention provides a technical solution by introducing a backlight module for use with a liquid crystal display device and comprises an optical module and a light source, wherein the backlight module further includes a heatsink device which includes a supporting portion and a vertical section perpendicular with each other. And wherein the supporting portion is used to carry the optical module, and the vertical section is used to carry the light source.

Wherein a transitional angle between the supporting portion and the vertical section, and the transitional angle is chamfered angle or C-shaped angle.

Wherein the heatsink device is made from aluminum.

Wherein a die is provided to create the heatsink device with extrusion or pulling.

Wherein the supporting portion is provided with a rib in an area adjacent to the vertical section, the rib including a top plateau projecting beyond an internal surface of the supporting portion.

Wherein the top plateau of the rib has a flattened top surface.

In order to resolve the technical issue encountered by the prior art, the present invention provides a technical solution by introducing a liquid crystal display device which includes a liquid crystal display panel, an optical module, and a light source, wherein the liquid crystal display device further includes a heatsink device configured with a supporting portion and a vertical section perpendicular to each other; wherein the supporting portion is used to carry the optical module, and the vertical section is used to carry the light source.

Wherein a transitional angle between the supporting portion and the vertical section, and the transitional angle is chamfered angle or C-shaped angle.

Wherein the heatsink device is made from aluminum.

Wherein a die is provided to create the heatsink device with extrusion or pulling.

Wherein the supporting portion is provided with a rib in an area adjacent to the vertical section, the rib including a top plateau projecting beyond an internal surface of the supporting portion.

Wherein the top plateau of the rib has a flattened top surface.

According to the preferred embodiment of the present invention, a substantially rectangular hollowed tube is provided, and which is configured with a first and second supporting portions, and first and second vertical sections. The tube is further cut through the first and second vertical sections so as to create first and second heatsink units. The technical solution of the present invention can readily resolve the weakness of the prior art heatsink material as which is too thin to be cut. Furthermore, the present invention can readily reduce the manufacturing cost of the heatsink unit, and is beneficial to the light, compact design of the product.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings

FIG. 2b is a cross sectional view of the aluminum extrusion tube of FIG. 2a;

FIG. 3b is a cross sectional view of the aluminum tube shown in FIG. 3a;

DETAILED DESCRIPTION OF PREFERRED EMBODIMENTS

Figure 1:
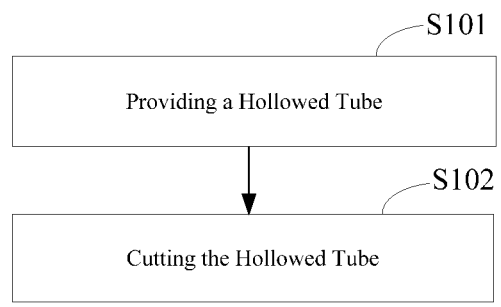
FIG. 1 is a flow chart illustrating the steps of making a heatsink device made in accordance with the present invention.

In order clearly explain the technology of the embodiment illustrated in the present invention, a brief and concise description will be given along with the accompanied drawings. Apparently, the embodiments illustrated in the drawings are merely some typical embodiments and which can be readily modified by the skilled in the art without any additional laborious efforts so as to transform them into other drawings, and they should all be covered by the appended claims.

Figure 2A:
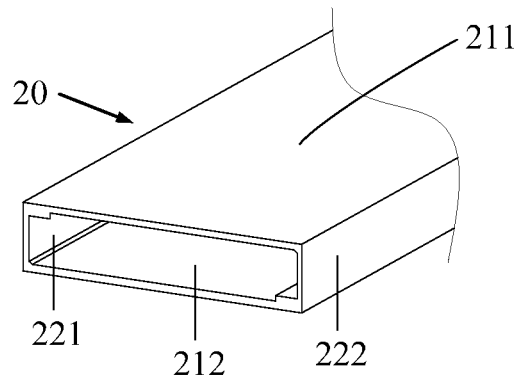
FIG. 2a is an illustrational and perspective view of an aluminum extrusion tube made with the method illustrated in FIG. 1.
Figure 2B:
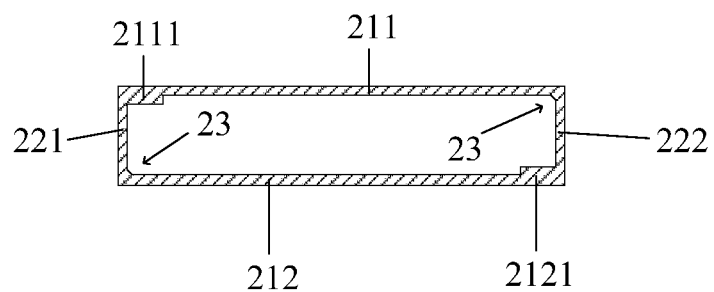
Figure 3A:
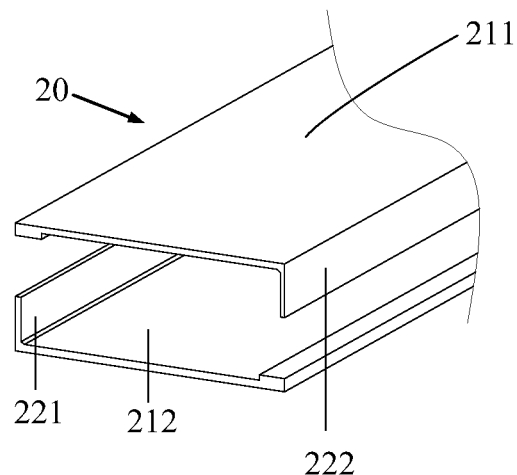
FIG. 3a is an illustrational and perspective view of the aluminum extrusion tube after the tube is cut along diagonal direction.
Figure 3B:
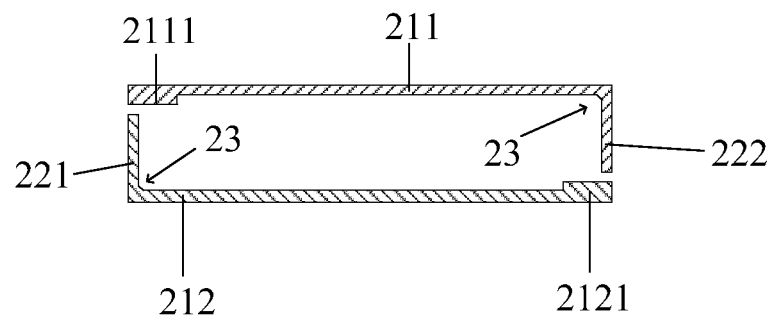

Referring to FIGS. 1 to 3b, wherein FIG. 1 is a flow chart illustrating the steps of making a heatsink device made in accordance with the present invention; FIG. 2a is an illustrational and perspective view of an aluminum extrusion tube made with the method illustrated in FIG. 1; FIG. 2b is a cross sectional view of the aluminum extrusion tube of FIG. 2a; FIG. 3a is an illustrational and perspective view of the aluminum extrusion tube after the tube is cut along diagonal direction; and FIG. 3b is a cross sectional view of the aluminum tube shown in FIG. 3a.

The method includes the following steps.

S101: providing a hollowed tube 20.

Preferably, the hollowed tube 20 or extrusion is made from aluminum.

In the present embodiment, the hollowed tube 20 can be made through extrusion or pulling of material from a die. It should be understood that other method can also be used to create the hollowed tube 20. As a result, no limitation on method should be set.

As shown in FIGS. 2a and 2b, substantially, the hollowed tube 20 has a hollowed configuration, and includes a first supporting portion 211, a second supporting portion 212, a vertical section 221, and a second vertical section 222. The cross sectional view of the hollowed tube 20 has a substantially rectangular shape. Preferably, the first supporting portion 211 is perpendicular to the first and second vertical sections 221, 222, and the second supporting portion 221 is perpendicular to the first and second vertical sections 221, 222. However, it can be readily understood that an angle between the first and second supporting 211, 221 and the first and second vertical sections 212, 222 can be other than 90 degrees, i.e. the first and second supporting portions 211, 221 may be tilted with respect to the first and second vertical sections 212, 222. Accordingly, no limitation should be imposed herewith.

Furthermore, when the hollowed tube 20 is manufactured and prepared, the first supporting portion 211 is provided with a first rib 2111 in an area adjacent to the first vertical section 221, and the second supporting portion 221 is provided with a first rib 2121 in an area adjacent to the first vertical section 222. The first and second ribs 2111 and 2121 extend beyond an inner surface of the first and second supporting portions 211, 221. The purpose of the first and second ribs 2111 and 2121 is to reinforce the rigidity and strength of the hollowed tube 20 so as to prevent the first and second supporting portions 211 and 221 from warping and deforming. Preferably, a top surface of the first and second ribs 2111 and 2121 are flattened. This is really beneficial to the manufacturing of the hollowed tube 20 and the cutting thereof. It can be readily appreciated tat the top surface of the first and second ribs 2111 and 2121 can be designed with waveform or other suitable form as long as it can reach its intended purpose and field requirements.

According to the preferred embodiment, when the hollowed tube 20 is made, the conjunction between the first supporting portion 211 and the first vertical section 221 is provided with a transitional angle 23, and the conjunction between the second supporting portion 221 and the second vertical section 222 is provided with a transitional angle 23. Preferably, the transitional angle 23 is a chamfered angle, or a circular curve, or a C-shaped angle. No limitation should be imposed herewith. The provision of the transitional angle 23 is to increase the heat transfer rate. As a result, the performance of heat dissipation rate for the liquid crystal display device can be apparently increased.

Step S102: cutting the hollowed tube 20.

As shown in FIGS. 3a and 3b, the hollowed tube 20 is cut through the first and second vertical sections 212 and 222 along a direction in aligning with the top surface of the first and second ribs 2111 and 2121. As a result, the hollowed tube 20 can be preferably divided so as to create two individual first and second heatsink units configured by the first supporting portion 211 and the first vertical section 221, and the second supporting portion 221 and the second vertical section 222, respectively.

According to the present invention, the hollowed tube 20 has a substantially rectangular cross section which can be referred to as the first supporting portion 211, the second supporting portion 212, the first vertical section 221, and a the second vertical section 222 which are interlinked together. Then the hollowed tube 20 is cut through the first and second vertical sections 212 and 222 so as to create two individual heatsink units. By the provision of the rectangular cross section of the hollowed tube 20, the overall strength and rigidity of the hollowed tube 20 can be increased.

Figure 4:
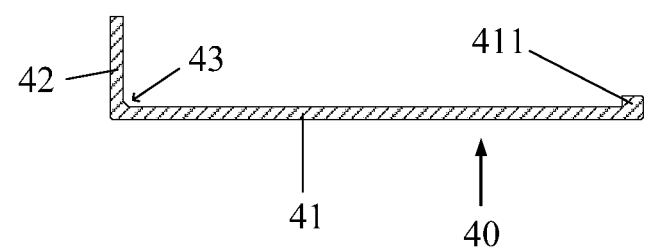
FIG. 4 is a cross sectional view of a heatsink device made in accordance with the present invention.

Referring to FIG. 4, which is a cross sectional view of a heatsink device made in accordance with the present invention. A heatsink unit for use with a backlight module is provided. The heatsink unit 40 is made with the method described above. Since the method has been detailedly described, no further description is given herebelow.

As described above, the heatsink unit 40 includes a supporting portion 41, a vertical section 42, and a rib 411. A transitional angle 43 is arranged between the supporting portion 41 and the vertical section 42. In general, the heatsink unit 40 has a "L-shaped" configuration. Since the function of each of the supporting portion 41, the vertical section 42, and the rib 411 have been described in details, no further description is given herebelow.

It can be readily understood that in the current embodiment, the heatsink unit 40 is made from a method from the first embodiment. In addition, as compared to the existing prior art, the heatsink unit 40 features stronger and improved rigidity which is in turn beneficial to a more compact, slim and light configuration. This is really advantageous to lower the manufacturing cost of the liquid crystal display device.

Figure 5:
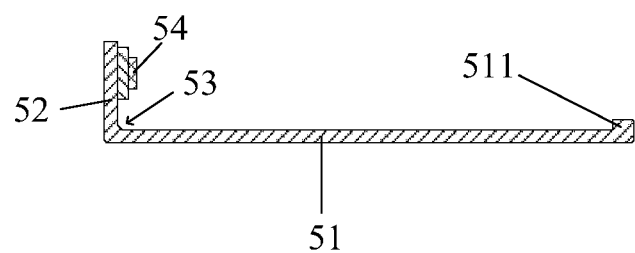
FIG. 5 is an illustrational and cross sectional view of a backlight module incorporated with a heatsink device illustrated in FIG. 4.

The present invention further provides a backlight module. As shown in FIG. 5, which is an illustrational and cross sectional view of a backlight module incorporated with a heatsink device illustrated in FIG. 4.

In the current embodiment, the backlight module includes an optical module (not shown in Figures), a light source 54, and the heatsink unit as described above. The heatsink unit includes a supporting portion 51, a vertical section 52, and a rib 511. In addition, there is a transitional angle 53 arranged between the supporting portion 51 and the vertical section 52. Since the function and configuration of the heatsink unit has been detailedly described above, no further description is given herebelow. The light source 54 can be attached to the vertical section 52 by means of glue or screw. No limitation should be limited to the manner of attaching the light source 54 to the vertical section 52.

It can be readily appreciated that after the backlight module made according to the present invention has incorporated with the heatsink unit made in accordance with above described embodiments, it is readily beneficial to the design trend of the slim, compact and light of the heatsink unit of the backlight module. It can readily reduce the manufacturing cost of the liquid crystal display device.

The present invention further provides a liquid crystal display device, and which includes a liquid crystal display panel, and a backlight module made according to the third embodiment of the present invention. The liquid crystal display panel is disposed onto the backlight module. Since the backlight module has been detailedly described, no further description is given herebelow.

It can be readily understood that when the liquid crystal display device is incorporated with the backlight module described above, the liquid crystal display device can readily reach its goal of having a light, slim and compact design of a heatsink unit. Since the material cost of the heatsink unit is effectively reduced, the manufacturing cost of the liquid crystal display device is reduced accordingly.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A method for making a heatsink device to be incorporated into a liquid crystal display device, the method comprising the steps of:
    (a) providing a hollowed tube having a substantially rectangular cross section, and the tube including a first supporting portion, a second supporting portion, a first vertical section, and a second vertical section interlinked with each other;
    (b) cutting the hollowed tube along the first and second vertical sections along a longitudinal direction such that first heatsink unit configured with the first supporting portion and the first vertical section, and a second heatsink unit configured with the second supporting portion and the second vertical section are created;
    (c) providing a first rib on the first supporting portion in an area adjacent to the first vertical section and providing a second rib on the second supporting portion in an area adjacent to the second vertical section, wherein the first and second ribs extend beyond an inner surface of the first and second supporting portions; and
    (d) grinding the first and second ribs so as to provide a top plateau thereof and cutting the first and second vertical sections inline with the top plateau of the first and second ribs so as to create the first heatsink unit and second heatsink unit.

2. The method as recited in claim 1, wherein further comprises the steps of having the first supporting portion being perpendicular to the first and second vertical sections, and having the second supporting portion being perpendicular to the first and second vertical sections.

3. The method as recited in claim 1, wherein further comprises the steps of providing a first transitional angle between the first supporting portion and the first vertical section, and providing a second transitional angle between the second supporting portion and the second vertical section, wherein the first and second transitional angles are chamfered angles or C-shaped angles.

4. The method as recited in claim 1, wherein the hollowed tube is made from aluminum.

5. The method as recited in claim 1, wherein further comprises the steps of providing a die so as to extrude the hollowed tube through the die.

* * * * *